(12) United States Patent
Ryon et al.

(10) Patent No.: US 11,649,830 B2
(45) Date of Patent: May 16, 2023

(54) PERFORATED IMPELLER BLADES

(71) Applicant: Delavan Inc., West Des Moines, IA (US)

(72) Inventors: Jason Ryon, Carlisle, IA (US); Jacob Greenfield, Granger, IA (US); Adrian L. Stoicescu, Roscoe, IL (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/484,857

(22) Filed: Sep. 24, 2021

(65) Prior Publication Data

US 2023/0099661 A1    Mar. 30, 2023

(51) Int. Cl.
*F04D 29/32* (2006.01)
*F02K 5/00* (2006.01)

(52) U.S. Cl.
CPC ............... *F04D 29/32* (2013.01); *F02K 5/00* (2013.01); *F05D 2230/31* (2013.01)

(58) Field of Classification Search
CPC ...... F04D 29/284; F04D 29/30; F04D 29/023; F04D 29/682; F04D 29/666; F04D 29/2277; F04D 29/32; F04D 29/24; F04D 29/242; F04D 29/28; F04D 29/2216; F04D 27/023; F04D 27/0238; F01D 5/048; F01D 5/147; F01D 5/046; F01D 5/18; F01D 5/28; F01D 5/34; F01D 9/045; F01D 5/04; F01D 5/043; F01D 5/087; F01D 5/085; F01D 25/12; F01D 5/082; F01D 5/16; F01D 5/14; F01D 5/12; F01D 5/088; F05D 2230/31; F05D 2240/301; F05D 2240/303; F05D 2250/51; F05D 2210/42; F05D 2250/52; F05D 2250/70; F02K 5/00
See application file for complete search history.

(56) References Cited

U.S. PATENT DOCUMENTS

| | | | |
|---|---|---|---|
| 6,860,715 B2 * | 3/2005 | Sekularac | F04D 29/681 415/115 |
| 9,903,207 B2 | 2/2018 | Tozzi et al. | |
| 2006/0115358 A1 | 6/2006 | Umeyama et al. | |
| 2017/0107821 A1 | 4/2017 | Schwarz | |
| 2020/0040739 A1 | 2/2020 | Notarnicola et al. | |
| 2021/0246903 A1 * | 8/2021 | Badr | F04D 29/245 |

OTHER PUBLICATIONS

Extended European Search Report dated Feb. 15, 2023, issued during the prosecution of European Patent Application No. EP 22197670.7.

* cited by examiner

*Primary Examiner* — Eric J Zamora Alvarez
(74) *Attorney, Agent, or Firm* — Locke Lord LLP; Joshua L. Jones; Scott D. Wofsy

(57) ABSTRACT

A method of making an impeller includes building the impeller in a layer by layer process in a build direction along the rotational axis starting from a base of the hub. The plurality of blades includes a plurality of perforated blades that support the shroud during additively manufacturing the impeller. The method can include installing the impeller in a fuel pump, air compressor, or the like, without removing the perforated blades from the impeller.

10 Claims, 4 Drawing Sheets

PERFORATED IMPELLER BLADES

BACKGROUND

1. Field

The present disclosure relates to impellers, and more particularly to impellers for applications such as fuel pumps and air compressors for use in aerospace applications and the like.

2. Description of Related Art

Shrouded impellers are typically cast as a single piece or machined as two separate pieces and brazed together. Casting a shrouded impeller is often extremely difficult due to the geometry of the impeller and/or inducer vanes. These long, thin features present solidification issues during casting, which results in poor yield and high cost. Brazed shrouded impellers often have a more repeatable, shorter lead processing path, but cost significantly more and require specialized inspection techniques and processing to verify the braze joint. Both cast and brazed impellers are limited in terms of the geometry that can be produced. Molten melt solidification limits how fine a feature can be cast. Machining stresses and access restrictions can limit how fine a feature can be cut.

The conventional techniques have been considered satisfactory for their intended purpose. However, there is an ever present need for improved systems and methods for producing impellers. This disclosure provides a solution for this need.

SUMMARY

An impeller includes a hub defining a rotational axis. A set of primary blades extends in an axial direction from the hub relative to the rotational axis. A shroud is supported by the primary blades, axially across the primary blades from the hub. The primary blades are circumferentially spaced apart from one another relative to the rotational axis. An inlet is defined between the shroud and the hub proximate a first extent of the primary blades in a radial direction relative to the rotational axis. An outlet is defined proximate a second extent of the primary blades opposite the first extent in the radial direction. A plurality of perforated blades extend axially from the hub, supporting the shroud. The perforated blades are circumferentially spaced apart from one another. Each of the perforated blades is circumferentially between each circumferentially adjacent pair of the primary blades. Each of the perforated blades has a plurality of openings therethrough.

Each of the perforated blades can define a perforated blade length and defines a plurality of columns spaced apart from one another along the perforated blade length. Each column can include a capital that tapers wide in a direction extending away from the respective base of the column. The capitals of the columns of the plurality of perforated blades, together with the primary blades, can support the shroud such that a ceiling surface of the shroud that is opposite from the hub across the primary blades is defined it its majority by the capitals. No portion of the ceiling surface need be locally 90° relative to the rotational axis. No portion of the ceiling surface need be locally between 80° and 90° relative to the rotational axis. Each column can branch from the respective base of the column at the hub into multiple branches supporting the shroud. Each of the multiple branches can include its own respective tapered capital.

There can be more perforated blades than there are primary blades, wherein multiple perforated blades are circumferentially between each circumferentially adjacent pair of the primary blades. Each of the perforated blades that is circumferentially between each circumferentially adjacent pair of the primary blades can be a splitter blade that is shorter than a flow passage between the circumferentially adjacent pair of the primary blades.

The inlet can open in an axial direction and is radially inward from the outlet, and the outlet can open in a radially outward direction relative to the rotational axis. The blades, hub, and shroud can be configured to drive aircraft fuel through the impeller from the inlet to the outlet. The blades, hub, and shroud can be configured to compress air passing through the impeller from the inlet to the outlet.

A method of making an impeller includes additively manufacturing an impeller as described above. The method includes building the impeller in a layer by layer process in a build direction along the rotational axis starting from a base of the hub. The plurality of blades includes a plurality of perforated blades that support the shroud during additively manufacturing the impeller. The method can include installing the impeller in a fuel pump, air compressor, or the like, without removing the perforated blades from the impeller.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
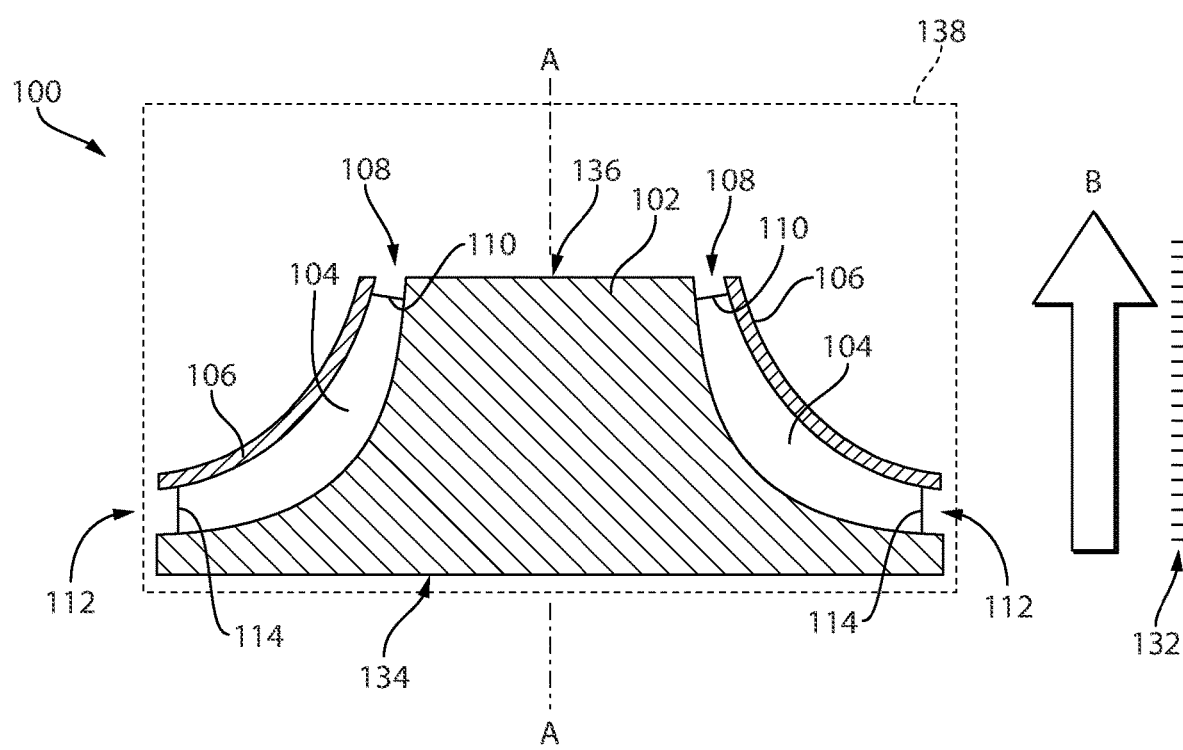
FIG. 1 is a schematic cross-sectional side elevation view of an embodiment of an impeller constructed in accordance with the present disclosure, showing the hub, the shroud, and the blades.

Reference will now be made to the drawings wherein like reference numerals identify similar structural features or aspects of the subject disclosure. For purposes of explanation and illustration, and not limitation, a partial view of an embodiment of an impeller in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to improve manufacturability, performance, and other characteristics of impellers such as used in fuel pumps, air compressors, and the like as used in aerospace applications.

Figure 2:
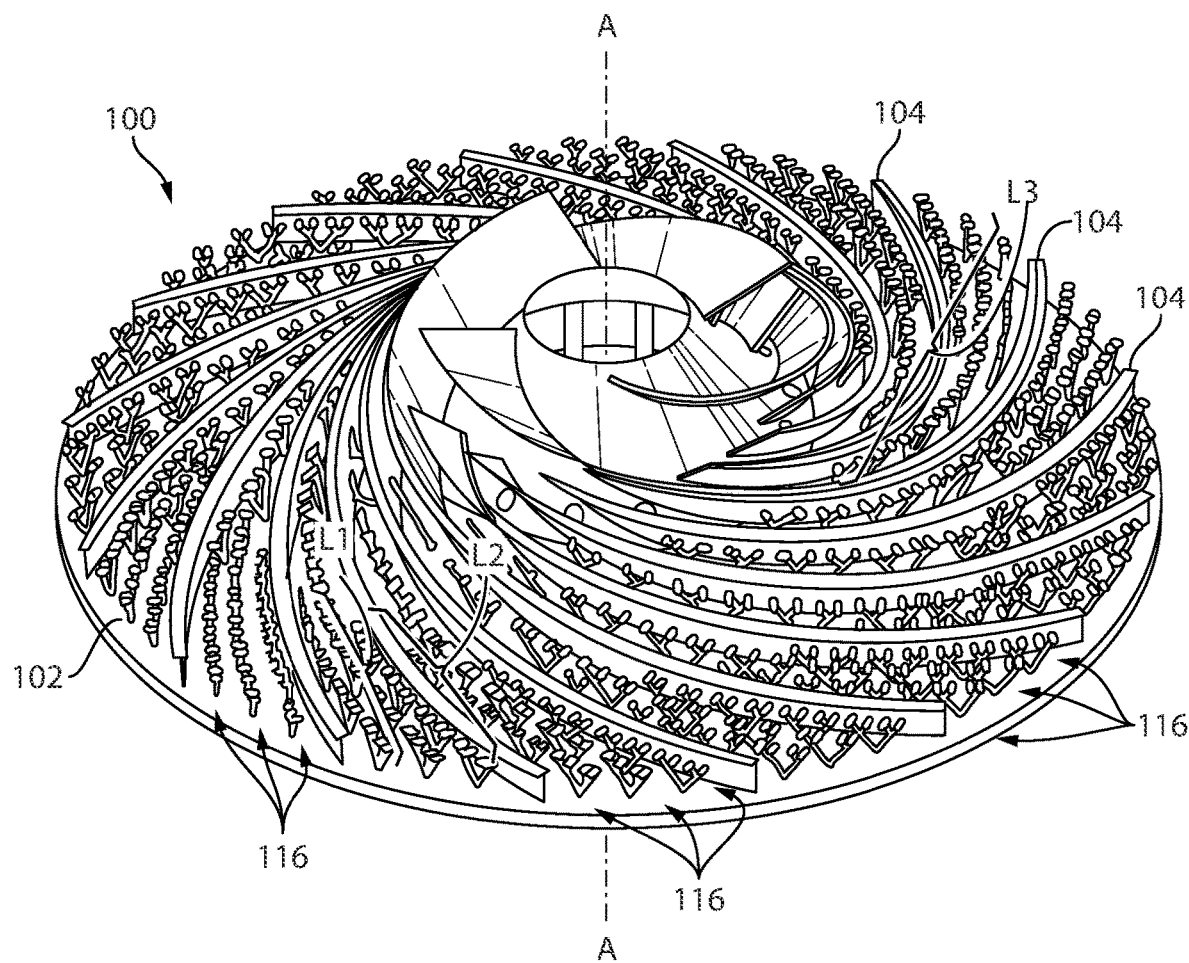
FIG. 2 is a schematic perspective view of the impeller of FIG. 1, showing the shroud removed to view the primary blades and the perforated blades.

The impeller 100 includes a hub 102 defining a rotational axis A. A set of primary blades 104 extends in an axial direction from the hub 102 relative to the rotational axis A. A shroud 106 is supported by the primary blades 104, axially across the primary blades 104 from the hub 102. The primary blades 104 are circumferentially spaced apart from one another relative to the rotational axis A, as shown in FIG. 2. An inlet 108 is defined between the shroud 106 and the hub 102 proximate a first extent or end 110 of the primary blades 104 in a radial direction relative to the rotational axis A. An outlet 112 is defined proximate a second extent or end 114 of the primary blades 104 opposite the first extent or end 110 in the radial direction. The outlet 112 is radially outward from the inlet 108. The inlet 108 opens in an axial direction, i.e. generally aligned with the rotational axis A. The outlet 112 opens in a radially outward direction relative to the rotational axis A. The blades 104, hub 102, and shroud 106 are configured to drive aircraft fuel through the impeller 100 from the inlet 108 to the outlet 112. It is also contemplated that the blades 104, hub 102, and shroud 106 can instead be configured to compress air passing through the impeller 100 from the inlet 108 to the outlet 112. The impeller 100 can also be configured for any other suitable application.

Figure 3:
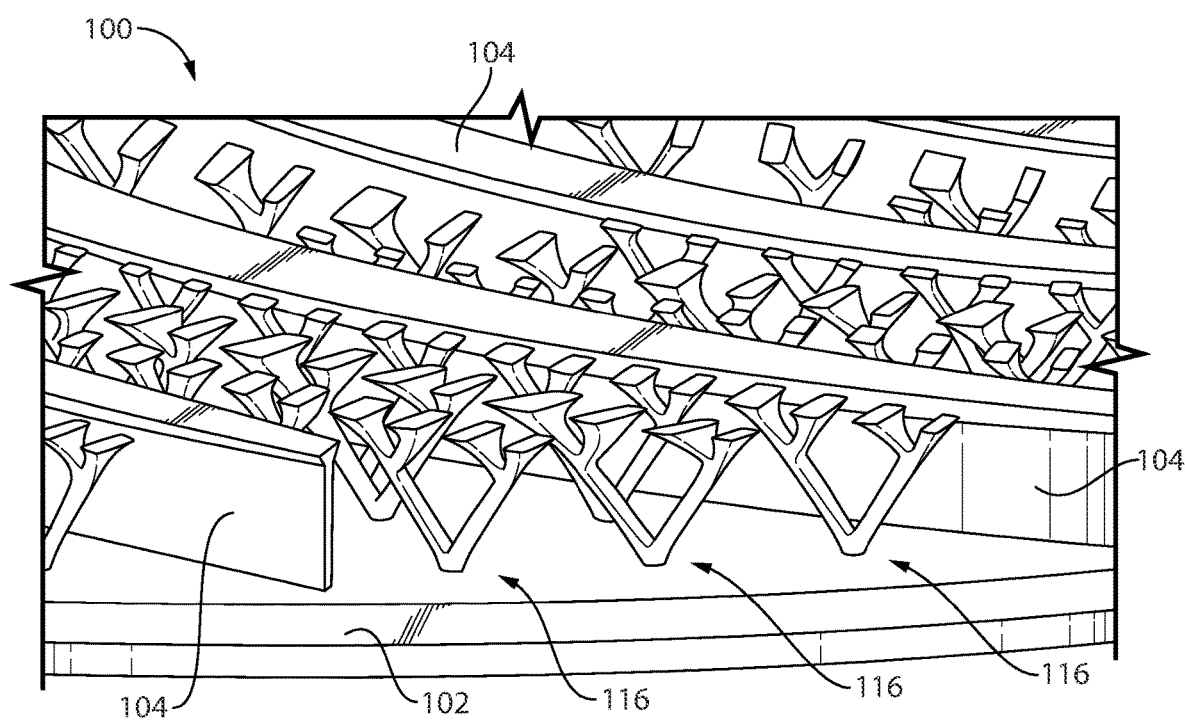
FIG. 3 is a schematic perspective view of the impeller of FIG. 2, showing some of the perforated blades with the shroud removed.

With reference now to FIG. 2, a plurality of perforated blades 116 extend axially from the hub 102, supporting the shroud 106 (which is not shown in FIG. 2, but see FIG. 1). The perforated blades 116 are circumferentially spaced apart from one another. Each of the perforated blades 116 is circumferentially spaced apart between each circumferentially adjacent pair of the primary blades 104. There are more perforated blades 116 than there are primary blades 104, so multiple perforated blades 116 are circumferentially spaced apart between each circumferentially adjacent pair of the primary blades 104, as shown in FIG. 3. As shown in FIG. 2, each of the perforated blades 116 is a splitter blade that is shorter in its length L1, L2, L3 in the flow direction through the impeller 100 than the flow passage between the circumferentially adjacent pair of the primary blades 104 on either side of the respective perforated blade 116. In other words, the perforated blades 116 are shorter than the primary blades 104. There are three respective perforated blades 116 between each circumferentially adjacent pair of primary blades 104, however those skilled in the art will readily appreciate that any suitable number one or more can be used instead of three. Moreover, while the perforated blades 116 are all shown as splitter blades that are shorter than the primary blades 104, the perforated blades 116 can be as long as the primary blades or longer if suitable for a given application.

Figure 4:
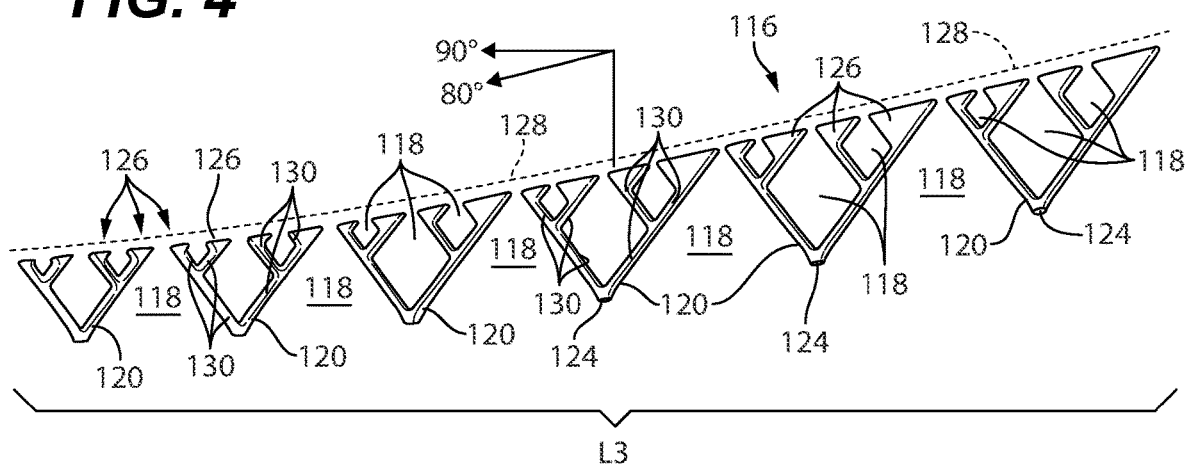
FIG. 4 is a schematic side elevation view of a portion of the impeller of FIG. 1, showing one of the perforated blades.
Figure 5:
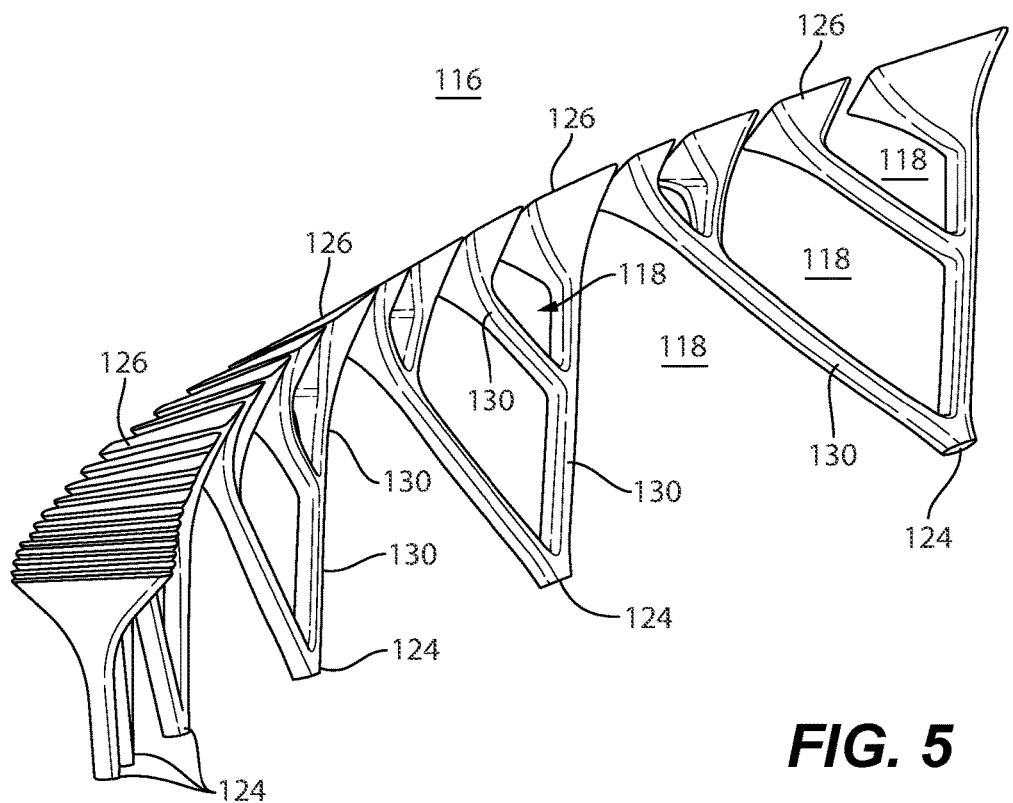
FIG. 5 is a schematic outlet end view of the perforated blade of FIG. 4.

With reference now to FIG. 4, each of the perforated blades 116 has a plurality of fenestrations or openings 118 therethrough. By way of contrast, the primary blades 104 (shown in FIGS. 1-3) are solid or non-perforated as they lack openings or fenestrations 118. Each of the perforated blades 116 defines a perforated blade length L3 (or L2 or L1 as labeled in FIG. 2) and defines a plurality of columns 120 spaced apart from one another along the perforated blade length L3. Each column 120 includes a capital 126 that tapers wide in a direction extending away from the respective base 124 of the column 120. The base 124 of each column 120 supports the column 120 upon the hub 102 (which is labeled in FIGS. 1-3). The capitals 126 of the columns 120, together with the primary blades 104 (labeled in FIGS. 1-3), support the shroud 106 (labeled in FIG. 1). A ceiling surface 128 of the shroud 106 that is opposite from the hub 102 across the primary blades 104 is defined it its majority by the capitals 126. FIG. 5 shows the tapered shape of the capitals 126 from another angle. As shown in FIGS. 4 and 5, each column 120 branches from the respective base 120 at the hub into multiple branches 130 supporting the shroud 106 (labeled in FIG. 1). Each of the multiple branches 130 includes its own respective tapered capital 126.

As shown in FIG. 4, due to the capitals 126, no portion of the ceiling surface 128 need be locally 90° relative to the rotational axis A, as indicated by the angles labeled in FIG. 4. No portion of the ceiling surface 128 need be locally between 80° and 90° relative to the rotational axis A. There are small exceptions possible, where the machine performing a build can tolerate small unsupported ceiling portions at around 80°-90° relative to the rotational axis A.

Even though portions of the shroud 106 can be 90° from the rotational axis A in the cross section of the shroud 106, e.g. through the centerline of that cross-section following the line of the ceiling surface 128 as it is schematically depicted in FIG. 4, the shroud 106 is supported laterally by the neighboring supports (columns 120 and capitals 126) the overhangs of which can be at an angle of 45° for example.

There are some very small unsupported overhangs, e.g. 80°-90°, which are allowable, e.g. at the very tip of an archway (openings 118) between two pairs of adjacent blade capitols 126. There can be a radius put in the ceiling surface 128 where the radius becomes tangent to the horizontal and this causes it to be 90 degrees from the build direction B of FIG. 1. In cases where it is a very small distance, the build will have enough support from the closest neighbors to still allow it to build properly.

With reference again to FIG. 1, a method of making an impeller includes additively manufacturing an impeller such as the impeller 100 described above. The method includes building the impeller 100 in a layer by layer process, schematically indicated by the gradations 132 in FIG. 1, depositing the layers 132 one after another in the build direction B along or parallel to the rotational axis A starting from a base 134 of the hub 102 and ending at the top 136 of the impeller 100 as oriented in FIG. 1. The plurality of blades includes a plurality of perforated blades, e.g. perforated blades 116 labeled in FIG. 2, and primary blades 104. Both types of blades 104, 116 support the shroud, e.g. shroud 106, during additively manufacturing the impeller 100.

While the perforate blades 116 serve as support structures during additive manufacture of the impeller, the method can include installing the impeller in a fuel pump, air compressor, or the like, e.g. on an aircraft, without removing the perforated blades 116 from the impeller 100. The pump, compressor, or the like is represented schematically in FIG. 1 by the box 138. The perforated blades 116 are a functional element of the finished product of the impeller 100.

The perforated blade as disclosed herein allows for using the additive manufacturing techniques in producing centrifugal pump impellers and the like, while maintaining the same hydraulic performance of a standard design in which there are only solid impeller blades. In terms of function, the use of the perforated blades can be beneficial, e.g. to pump stability at high turn down flows by the increase in the boundary layer viscous drag effects. While branching columns 120 are shown and described herein, any suitable perforated or fenestrated blade geometry can be used without departing from the scope of this disclosure. Beneficial structures can reduce a full solid blade to a grid or lattice of supporting structures that allow supporting the roof surfaces in the additive manufacturing process, but can be designed to introduce little to no pressure loading, or work, to the operating fluid.

The perforated blades 116 act as a support structure for the impeller shroud surfaces that face downward relative to gravity during the additive manufacturing process. The perforated blades can create a more robust fluid boundary layer, thereby reducing boundary layer separation at lower flow rates and improving impeller flow stability. The perforated blades can also reduce overall weight of the impeller. The perforated blades can allow for the baseline impeller blade configuration to be maintained, thereby reducing design re-work when utilizing techniques disclosed herein.

The methods and systems of the present disclosure, as described above and shown in the drawings, provide for improved manufacturability, performance, and other characteristics of impellers such as used in fuel pumps, air compressors, and the like as used in aerospace applications. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An impeller comprising:
   a hub defining a rotational axis;
   a set of primary blades extending in an axial direction from the hub relative to the rotational axis;
   a shroud supported by the primary blades, the shroud axially across the primary blades from the hub, wherein the primary blades are circumferentially spaced apart from one another relative to the rotational axis, wherein an inlet is defined between the shroud and the hub proximate a first extent of the primary blades in a radial direction relative to the rotational axis, and an outlet is defined proximate a second extent of the primary blades opposite the first extent in the radial direction; and
   a plurality of perforated blades extending axially from the hub and supporting the shroud, wherein the perforated blades are circumferentially spaced apart from one another, and wherein each of the perforated blades is circumferentially between a circumferentially adjacent pair of the primary blades, and wherein each of the perforated blades has a plurality of openings therethrough, wherein each of the perforated blades defines a perforated blade length and defines a plurality of columns spaced apart from one another along the perforated blade length.

2. The impeller as recited in claim 1, wherein each column includes a capital that tapers wide in a direction extending away from a respective base of the column, wherein each capital of the plurality of columns of the plurality of perforated blades, together with the primary blades, support the shroud such that a majority of a ceiling surface of the shroud that is opposite from the hub across the primary blades is defined by each capital.

3. The impeller as recited in claim 2, wherein no portion of the ceiling surface is locally 90° relative to the rotational axis.

4. The impeller as recited in claim 2, wherein no portion of the ceiling surface is locally between 80° and 90° relative to the rotational axis.

5. The impeller as recited in claim 2, wherein each column branches from the respective base at the hub into multiple branches supporting the shroud.

6. The impeller as recited in claim 5, wherein each of the multiple branches includes a corresponding tapered capital.

7. The impeller as recited in claim 1, wherein there are more perforated blades than primary blades, wherein multiple perforated blades are circumferentially between each circumferentially adjacent pair of the primary blades.

8. The impeller as recited in claim 1, wherein each of the perforated blades circumferentially between each circumferentially adjacent pair of the primary blades is a splitter blade that is shorter than a flow passage between the circumferentially adjacent pair of the primary blades.

9. The impeller as recited claim 1, wherein the inlet opens in the axial direction and is radially inward from the outlet, and wherein the outlet opens in the radially outward direction relative to the rotational axis, wherein the blades, the hub, and the shroud are configured to drive aircraft fuel through the impeller from the inlet to the outlet.

10. The impeller as recited in claim 1, wherein the inlet opens in the axial direction and is radially inward from the outlet, and wherein the outlet opens in the radially outward direction relative to the rotational axis, wherein the blades, the hub, and the shroud are configured to compress air passing through the impeller from the inlet to the outlet.

\* \* \* \* \*